(12) United States Patent
Friggeri et al.

(10) Patent No.: US 11,727,018 B1
(45) Date of Patent: Aug. 15, 2023

(54) SELECTING CONTENT AND IDENTIFYING USERS FOR IDENTIFICATION TO ADDITIONAL USERS OF SOCIAL NETWORKING SYSTEM BASED ON USER ATTRIBUTES OR CONTENT ITEM CHARACTERISTICS

(71) Applicant: Meta Platforms, Inc., Menlo Park, CA (US)

(72) Inventors: Adrien Thomas Friggeri, Cupertino, CA (US); Japinder Singh, Cupertino, CA (US); Thomas Frederick Dimson, Stanford, CA (US); Gregor Hochmuth, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/917,732

(22) Filed: Jun. 30, 2020

Related U.S. Application Data (63) Continuation of application No. 14/288,207, filed on May 27, 2014, now Pat. No. 10,698,907.

(51) Int. Cl.
*G06F 16/248* (2019.01)
*H04L 67/02* (2022.01)
(Continued)

(52) U.S. Cl.
CPC ...... *G06F 16/24578* (2019.01); *G06F 16/248* (2019.01); *G06F 16/9535* (2019.01);
(Continued)

(58) Field of Classification Search
CPC ......... H04L 51/14; H04L 51/32; H04L 67/02; H04L 67/025; H04L 67/18; H04L 67/20; H04L 67/306
(Continued)

(56) References Cited

U.S. PATENT DOCUMENTS

2010/0287033 A1\* 11/2010 Mathur .............. G06F 16/9535
725/44
2012/0030287 A1\* 2/2012 Leonard ................. G06Q 10/10
709/204

(Continued)

*Primary Examiner* — James E Springer
*Assistant Examiner* — Patrick F Ngankam
(74) *Attorney, Agent, or Firm* — McDermott Will & Emery LLP (57) ABSTRACT

A social networking system provides a user with a feed of content items associated with other users connected to the user via the social networking system. Additionally, the social networking system identifies additional content items for presentation to the user and generates an additional feed including the additional content items. The additional content items may be determined by identifying content items having various characteristics and scoring the content items based on the characteristics. Content items having at least a threshold score are identified as additional content items. Examples of characteristics of content items include users providing content items to the social networking system, locations associated with social networking system users, and interaction with content items by social networking system users. In some embodiments, the additional feed modifies presentation of the additional content items based on their associated scores.

20 Claims, 3 Drawing Sheets

(51) Int. Cl.
*G06F 40/186* (2020.01)
*H04L 67/306* (2022.01)
*H04L 67/025* (2022.01)
*G06F 16/9535* (2019.01)
*H04L 51/52* (2022.01)
*H04L 51/214* (2022.01)
*H04L 67/52* (2022.01)
*H04L 67/53* (2022.01)
*G06F 16/2457* (2019.01)

(52) U.S. Cl.
CPC .......... *G06F 40/186* (2020.01); *H04L 51/214* (2022.05); *H04L 51/52* (2022.05); *H04L 67/02* (2013.01); *H04L 67/025* (2013.01); *H04L 67/306* (2013.01); *H04L 67/52* (2022.05); *H04L 67/53* (2022.05)

(58) Field of Classification Search
USPC .......................................................... 707/728
See application file for complete search history.

(56) References Cited

U.S. PATENT DOCUMENTS

| 2012/0166532 | A1 | 6/2012 | Juan et al. | |
|---|---|---|---|---|
| 2012/0304050 | A1* | 11/2012 | Tiu, Jr. ................. | G06F 16/958 715/234 |
| 2014/0075289 | A1* | 3/2014 | Brant .................... | G06F 40/186 715/234 |
| 2014/0156360 | A1 | 6/2014 | Shalita et al. | |
| 2014/0156566 | A1 | 6/2014 | Kabiljo et al. | |
| 2014/0156744 | A1 | 6/2014 | Hua et al. | |
| 2014/0172877 | A1* | 6/2014 | Rubinstein .......... | G06F 16/9535 707/748 |
| 2014/0189530 | A1 | 7/2014 | Anand et al. | |

* cited by examiner

SELECTING CONTENT AND IDENTIFYING USERS FOR IDENTIFICATION TO ADDITIONAL USERS OF SOCIAL NETWORKING SYSTEM BASED ON USER ATTRIBUTES OR CONTENT ITEM CHARACTERISTICS

PRIORITY CLAIM

This application claims benefit under 35 U.S.C. § 120 as a Continuation of application Ser. No. 14/288,207, filed May 27, 2014. The entire contents of which is hereby incorporated by reference as if fully set forth herein. Applicant hereby rescinds any disclaimer of claim scope in the parent application(s) or the prosecution history thereof and advise the USPTO that the claims in this application may be broader than any claim in the parent application(s).

BACKGROUND

This disclosure relates generally to recommending content to social networking system users, and more specifically to identifying content items or users for presentation to a social networking system user.

A social networking system allows its users to connect to and communicate with other social networking system users. For example, a social networking system allows a user to maintain content items, such as images or video data, and present the content items to other social networking system users. A social networking system user may establish a connection to other users, prompting the social networking system to present content items received from the other user to the user, encouraging interaction between the various users.

However, many conventional social networking systems merely present a content item received from a user to other users connected to the user or identify additional users that are connected to users connected to the user as possible users with which the user may establish a connection. However, this may result in a user being presented with content items or additional users in which the user may have minimal interest. If a social networking system presents the user with content items or users in which the user is uninterested, the user may discourage the user from interacting with the social networking system.

SUMMARY

A social networking system retrieves information describing one or more attributes of a social networking system user. Examples of attributes associated with the user include demographic information, actions associated with the user, connections between the user and additional users, or other suitable information describing the user. The social networking system also generates a feed including various content items for presentation to the user. The feed may include content items associated with one or more additional users connected to the user via the social networking system. To identify additional content items for presentation to the user, the social networking system retrieves content items having one or more characteristics from a set of characteristics. Example characteristics of a content item include attributes of a user providing the content item to the social networking system, information describing additional social networking system users that interacted with the content item, temporal information associated with the content item or associated with a user associated with the content item, or any other suitable information associated with a content item. A content item may have various characteristics.

A score is generated for each of the retrieved content items based at least in part on the retrieved information associated with the user and one or more characteristics of a retrieved content item. The score associated with a content item represents a measure of the user's interest in the content item. In some embodiments, the score is a numerical value. Additionally, in some embodiments, a user's interest in a retrieved content item is proportional to the content item's score, so a higher score associated with a content item represents a higher interest of the user in the content item and a lower score associated with the content item represents a lower interest of the user in the content item. A content item's score may be based on a level of similarity between attributes of the user, identified from the retrieved information, and characteristics of a retrieved content item. For example, a content item's score is proportional to a number or percentage of attributes of the user matching or similar to characteristics of the retrieved content item. Various characteristics of a retrieved content item may be differently weighted when generating the content item's score. For example, a characteristic of a content item more relevant to a user based on attributes of the user has a higher weight than other characteristics of the content item.

Based at least in part on the scores associated with each of the content items in the set, one or more content items are selected from the set and included in an additional feed of content items. For example, content items from the set having at least a threshold score or having the maximum scores of content items in the set are selected. The additional feed of content items is communicated to a client device for presentation to the user. When presenting selected content items to the user in the additional feed, a format in which a content item is presented may be based at least in part on the score associated with the content item. For example, the additional feed presents content items based on a template including different size slots for presenting content items. The size of a slot used to present a content item selected from the set may be based at least in part on the score associated with a content item to be presented in the slot; for example, the slot size is proportional to the score associated with the content item to be presented in the slot.

In addition to identifying content items for a user, in some embodiments, the social networking system identifies additional users to the user based at least in part on the retrieved information associated with the user. The identified additional users are users in which the social networking system determines the user has at least a threshold interest. Various criteria may be used to select the additional users. For example, attributes of the user, attributes of the additional users, characteristics of content items associated with the user, characteristics of content items associated with the additional users, or other suitable information may be used.

In one embodiment, attributes of the user are compared to attributes of additional users of the social networking system and an additional user is selected based on the comparison. For example, an additional user having at least a threshold number or percentage of attributes matching or similar to attributes of the user is selected. Alternatively, characteristics of content items associated with additional users are identified, and an additional user is selected based on a comparison between the characteristics of content items associated with the additional user and attributes of the user or characteristics of content items associated with the user. For example, an additional user associated with content items having at least a threshold number or percentage of characteristics matching characteristics of content items associated with the user is selected.

Based on the information associated with the user, one or more content items associated with the selected additional user are selected, and the selected content items associated with the selected additional user and an identifier associated with the selected additional user are communicated to a client device for presentation to the user. For example, content items associated with the selected additional user and having at least a threshold number or percentage of characteristics matching characteristics of content items associated with the user or matching attributes associated with the user are selected. As described above, the presentation of the selected content items may be based on a degree of similarity between characteristics of the selected one or more content items and attributes of the user or characteristics of the user's content items.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
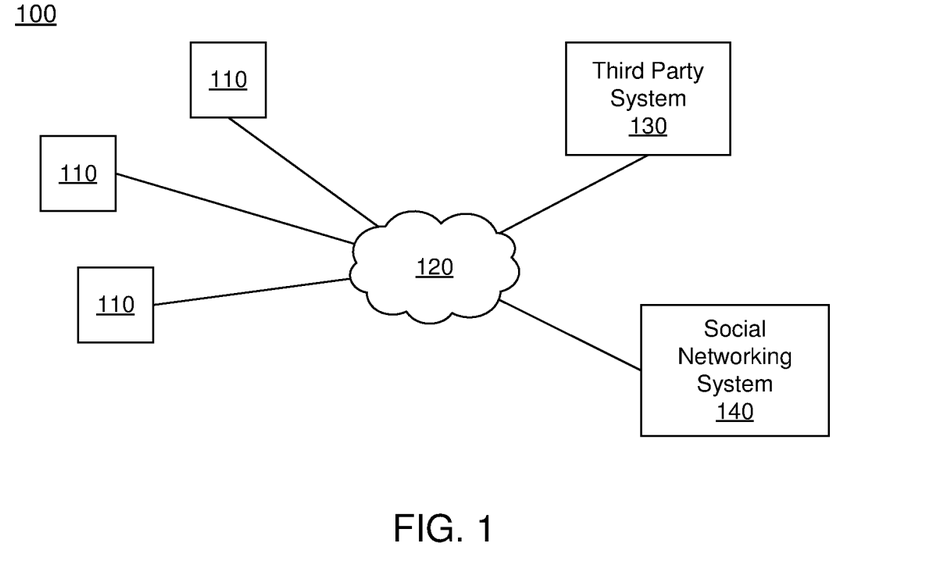
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
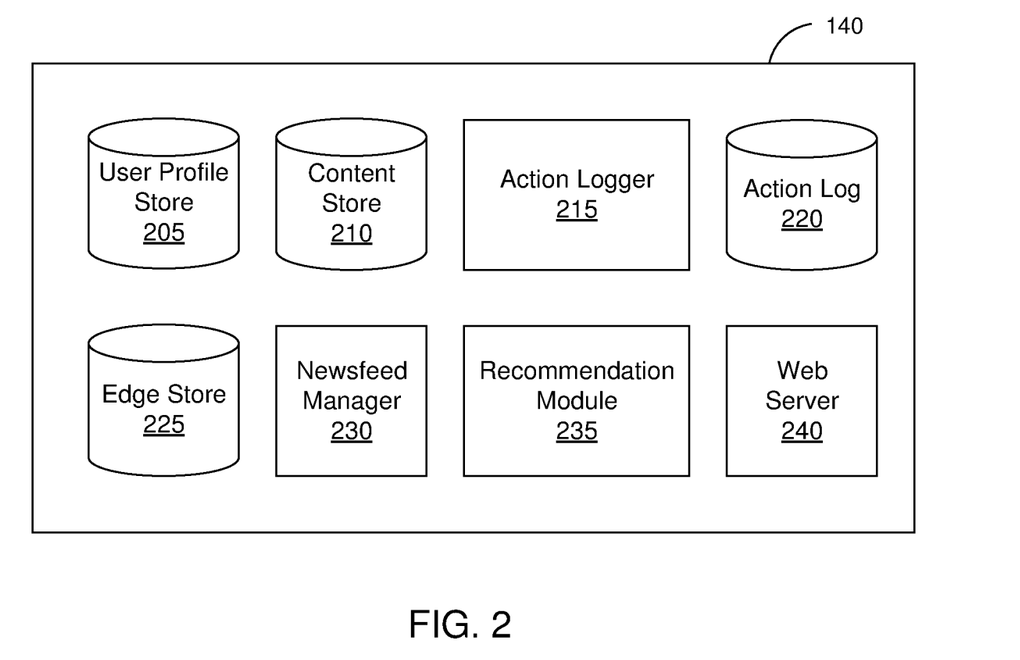
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, newsfeed manager 230, recommendation module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity. A user of the social networking system may also be referred to herein as an "account" of the social networking system 140.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140. The connections between users and other objects, or edges, can be uni-directional (e.g., a user following another user) or bi-directional (e.g., a user is a friend with another user).

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users.

Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the social networking system 140 identifies stories likely to be of interest to a user through a "newsfeed" or "feed" presented to the user. A story presented to a user describes an action taken by an additional user connected to the user and identifies the additional user. In some embodiments, a story describing an action performed by a user may be accessible to users not connected to the user that performed the action. The newsfeed manager 230 may generate stories for presentation to a user based on information in the action log 220 and in the edge store 225 or may select candidate stories from content items stored in the content store 210. One or more of the candidate stories are selected and presented to a user by the newsfeed manager 230.

For example, the newsfeed manager 230 receives a request to present one or more stories to a social networking system user. The newsfeed manager 230 accesses one or more of the user profile store 205, the content store 210, the action log 220, and the edge store 225 to retrieve information about the identified user. For example, stories or other data associated with users connected to the identified user are retrieved. The retrieved stories or other data are analyzed by the newsfeed manager 230 to identify content likely to be relevant to the identified user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user.

In various embodiments, the newsfeed manager 230 presents stories to a user through a feed including a plurality of stories selected for presentation to the user. The feed may include a limited number of stories or may include a complete set of candidate stories. The number of stories included in a feed may be determined in part by a user preference included in user profile store 205. The newsfeed manager 230 may also determine the order in which selected stories are presented via the feed. For example, the newsfeed manager 230 determines that a user has a highest affinity for a specific user and increases the number of stories in the feed associated with the specific user or modifies the positions in the feed where stories associated with the specific user are presented.

The newsfeed manager 230 may also account for actions by a user indicating a preference for types of stories and selects stories having the same, or similar, types for inclusion in the feed. Additionally, the newsfeed manager 230 may analyze stories received by social networking system 140 from various users to obtain information about user preferences or actions from the analyzed stories. This information may be used to refine subsequent selection of stories for feeds presented to various users, as described further in conjunction with FIGS. 3 and 4.

The recommendation module 235 identifies content items or additional users of the social networking system 140 in which a user is likely to have at least a threshold level of interest. This allows the social networking system 140 to present the user with a broader range of content items or to interact with a greater variety of users, increasing the amount of interaction between the user and the social networking system. In one embodiment, the recommendation module 235 identifies attributes of a user based on a user profile in the user profile store 205 corresponding to the user. Examples of attributes associated with a user include demographic information (e.g., age, location, gender, etc.), actions (e.g., check-ins), or other suitable information as described further in FIG. 3. To identify content items for recommendation to a user, the recommendation module 235 retrieves content items from the content store 210 that have one or more characteristics from a set of characteristics. Example characteristics of a content item include attributes of a user who posted the content item to the social networking system, information describing additional social networking system users that interacted with the content item, temporal information associated with the content item or associated with a user associated with the content item, or any other suitable information associated with a content item. The set of content items may be based on attributes of the user, based on attributes of a variety of social networking system users, or a combination of user-specific and global user attributes.

A score representing a measure of the user's likely interest in a content item is determined for each of the retrieved content items. A content item's score may be based on the content item's characteristics and attributes of the user. Based on the scores associated with the retrieved content items, one or more of the retrieved content items are selected and presented to the user, as further described below in conjunction with FIG. 3.

Additionally, the recommendation module 235 may identify additional users of the social networking system 140 to a user. For example, the recommendation module 235 identifies additional users having at least a threshold number or percentage of attributes matching or similar to attributes of a user. Content items associated with various identified additional users are identified and the recommendation module 235 selects an additional user based on the content items associated with the additional user. For example, the recommendation module 235 selects an additional user associated with at least a threshold number or percentage of content items having at least a threshold number of percentage of characteristics matching or similar to characteristics of content items associated with the user. For example, content items associated with a user may be content items posted by the user or content items interacted with by the user as described in conjunction with the action log 220.

Based on the characteristics of content items associated with the selected additional user, attributes of the selected additional user, attributes of the user, characteristics of content items associated with the user, or any combination thereof, one or more content items associated with the selected additional user are identified and presented to the user. For example, content items associated with the selected additional user are identified based on a measure of similarity between characteristics of content items associated with the selected additional user and characteristics of content items associated with the user or are identified based on a measure of similarity between attributes of the user and attributes of the selected additional user. A user identifier associated with the selected additional user is presented along with the identified content items associated with the additional user, allowing the user to subsequently retrieve additional content items associated with the selected additional user. Identification of one or more additional users to a social networking system user is further described below in conjunction with FIG. 4.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
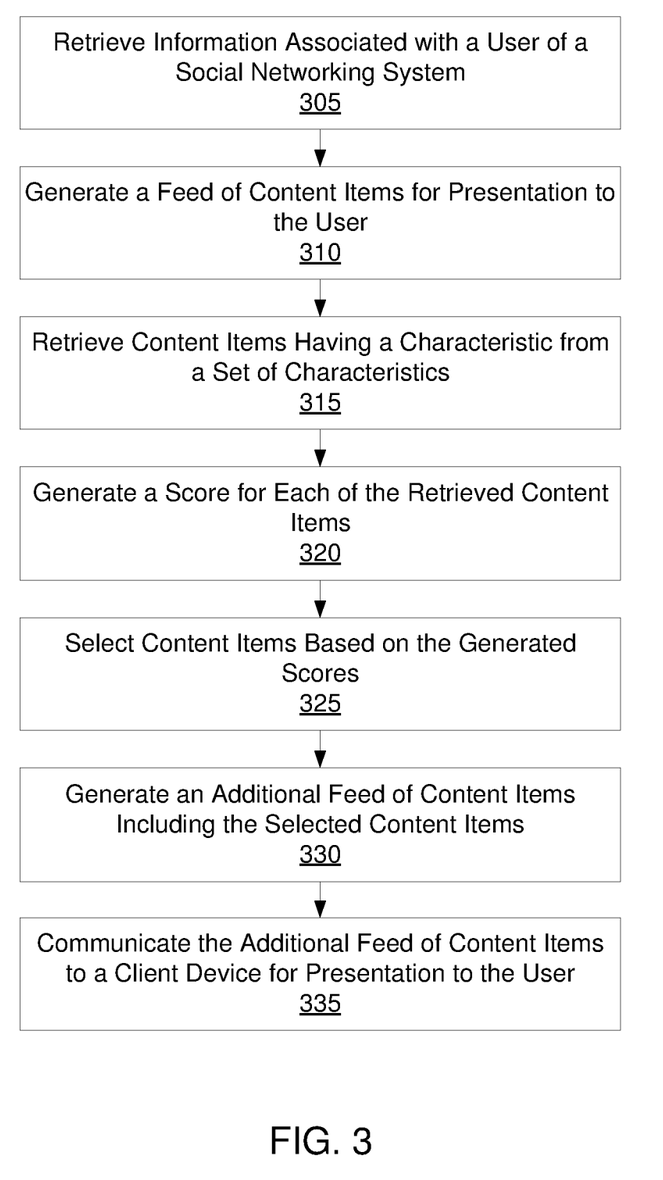
FIG. 3 is a flow chart of a method for selecting content items for presentation to a user based on content item characteristics, in accordance with an embodiment.

Selecting Content Items Based on Characteristics of Content Items and Attributes of a User FIG. 3 is a flow chart of one embodiment of a method for selecting content items for presentation to a social networking system user based on characteristics of the content items. In various embodiments, the steps described in conjunction with FIG. 3 may be performed in different orders. Additionally, in some embodiments, the method may include different and/or additional steps than those shown in FIG. 3. The functionality described in conjunction with the social networking system 140 in FIG. 3 may be provided by the newsfeed manager 230 and recommendation module 235, in one embodiment, or may be provided by any other suitable component, or components, in other embodiments. Additionally, the client device 110 may execute one or more instructions associated with the social networking system 140, such as an application associated with the social networking system 140, to provide the functionality described in conjunction with FIG. 3.

The social networking system 140 retrieves 305 information associated with a user of the social networking system 140. For example, the social networking system 140 retrieves 305 information in a user profile associated with the user, actions associated with the user, and/or connections between the user and additional social networking system user. In some embodiments, the information may be retrieved from an additional social networking system or other third party system 130 maintaining information about the user and that the user authorizes the social networking system 140 to access.

Various types of information associated with the user may be retrieved 305. For example, user-specific attributes describe demographic characteristics associated with the user (e.g., location, age, gender, education history, etc.), other users connected to the user via the social networking system 140 or via a third party system 130, and may also describe demographic characteristics of users connected to the user via the social networking system 140. Interaction-specific attributes, which describe the user's interaction with content items or other social networking system users may be retrieved 305. Examples of interaction-specific attributes include comments provided by a user for a content item associated with another user, content items in which the user expressed a preference (i.e., content items the user "liked"), content items shared with other users by the user (including a number of times the user shared the content item), connections to other users or objects established by the user, a location associated with an interaction performed by the user, or other suitable information. Additionally, time-based attributes associated with the user may be retrieved 305. A time-based attribute provides contextual information associated with a user interaction. Examples of time-based attributes include type of device used by the user to interact with a content item, a time when the user interacted with a content item or other suitable information.

In addition to retrieving 305 information associated with the user, the social networking system 140 generates 310 a feed including one or more content items for presentation to the user. The feed includes content items associated with one or more additional users connected to the user via the social networking system 140 and/or via a third party system 130. Examples of additional users connected to the user include: an additional user with which the user established a connection via the social networking system 140, an additional user associated with a content item in which the user indicated a preference or shared with another user, or an additional user connected to the user via a third party system 130. The feed presents content items to the user, and may present content items based on a template including a plurality of slots, with each slot identifying a location in a display area where a content item is presented. In some embodiments, different slots in the template have different sizes. Content items associated with the user can be selected from content items from one or more additional users connected to the user.

To identify additional content items for presentation to the user, the social networking system 140 retrieves 315 content items having one or more characteristics from a set of characteristics. A characteristic of a content item is information describing the content item, and a content item may be associated with multiple characteristics. Example characteristics of a content item include: information describing a user providing the content item to the social networking system 140, information describing interactions with the content item (e.g., comments associated with the content item, user identifiers of users that interacted with the content item, users expressing a preference for the content item, a number of times the content item has been shared with social networking system users, a number of times the content item was viewed, or other suitable interactions between social networking system users and the content item). Time-based characteristics of a content item include a location associated with the content item, a date and/or time associated with the content item, a location associated with one or more users associated with the content item, a type of device used to provide the content item to the social networking system 140, a type of device associated with interactions with the content item, a time when a threshold number of users interacted with the content item, or any other suitable information describing interaction with the content item. For example, a location associated with a content item may be a geographic location where the content item was generated (e.g., a location where a picture was captured), a geographic location where a user interacted with the content item, or a geographic location associated with a user or entity identified by the content item (e.g., a location associated with a user included in a picture). A location associated with a user may be a geographic location from which the user currently interacts with the social networking system 140, a geographic location associated with the user in a user profile, a geographic location from which the user interacted with a content item, or any other suitable geographic location.

Characteristics associated with a content item may also be based on metadata or other data associated with the content item. Examples of metadata associated with a content item includes information describing processing of the content item, users tagged in the content item, tags (e.g., hashtags) associated with the content item. Textual data associated with a content item includes a title or caption associated with the content item, as well as information describing a language associated with the title or caption. If a content item includes image data or video data, information describing processing of the content item includes information describing image processing and image manipulation performed on the content item. For example, information describing processing of a content item includes results of character recognition algorithms applied to image data or video data, enhancement algorithms applied to the image data or video data, filters applied to the image data or video data, object detection algorithms applied to the image data or video data, and other suitable algorithms used to process the image or video. Information describing manipulation of image data or video data in a content item includes resizing the image data or video data, shortening video data, modifying image or video resolution, or other suitable modifications.

In one embodiment, the social networking system 140 compares characteristics associated with various content items to a set of characteristics. For example, the social networking system 140 maintains a global set of characteristics to which characteristics of content items are compared. The global set of characteristics may include a specified number of characteristics and specified types of characteristics. Alternatively, the set of characteristics is based on attributes of the retrieved information of the user, with the types of characteristics included in the set based at least in part on the attributes of the user. The number of characteristics included in the set may also be based at least in part on the attributes of the user determined from the retrieved information. Content items having a threshold number of characteristics matching or similar to characteristics from the set of characteristics are retrieved 315 from the content store 210 or from another suitable source.

The social networking system 140 generates 320 a score for each of the retrieved content items. A content item's score is based on the retrieved information associated with the user and characteristics of the content item. The score of a content item represents a measure of the user's interest in the content item. In one embodiment, the score is proportional to the user's interest in the content item, so a higher score for a content item represents a higher interest of the user in the content item and a lower score represents a lower interest of the user in the content item. A content item's score may be proportional to a number of characteristics of the content item matching, or similar to, attributes of the user determined from the retrieved information. The score associated with a content item may be a numerical value based on a number of characteristics of the content item matching or similar to attributes of the user, based on a percentage of characteristics of the content item matching or similar to attributes of the user, or based on any other suitable value. In some embodiments, the score may be normalized by a total number of characteristics in the set of characteristics, a total number of attributes of the user from the retrieved information, or a total number of characteristics in the set of characteristics and attributes of the user.

When generating 320 a score for a content item, different characteristics of the content item may be weighted differently. In one embodiment, a weight associated with a characteristic represents a relative importance or relevance of the characteristic to the user. For example, the social networking system 140 analyzes prior user interactions with content items to identify characteristics of content items with which the user has a threshold amount of interaction or has a threshold frequency of interaction. Characteristics of a content item matching an identified characteristic may be increased by a weight. Alternatively, a weight is associated with a characteristic of a content item matching an attribute of the user based on a type of attribute of the user that the characteristic matches. For example, different weights are associated with a characteristic depending on whether the characteristic matches, or is similar to, a user-specific attribute, an interaction-specific attributes, or a time-based attribute. As a specific example, an increased weight is associated with a characteristic if the characteristic matches an interaction-specific attribute rather than a time-based attribute. As another example, if prior interactions between the user and content items indicate that the user more frequently interacts with content items associated with a specific location, a characteristic of a content item matching the specific location is weighted higher than characteristics of the content item matching other attributes of the user.

The weights associated with various content items characteristic may be modified. For example, as a user's location changes, characteristics of content items may be differently weighted. However, in various embodiments, weights may be modified based on changes in any suitable user attribute. In some embodiments, characteristics of the content item matching a time-based attribute of the user are weighted more heavily than characteristics of the content item matching other attributes of the user. For example, if information associated with the user indicates the user is at an event, such as a concert, while the user is at the event, a content item characteristic matching a location associated with the event is associated with a higher weight than other characteristics matching other attributes of the user. When the user is not at the event, a content item's characteristic matching a location associated with the event may be associated with a lower weight. In some embodiments, characteristics of a content item may affect the score associated with the content item. For example, a score of a content item posted to the social networking system 140 during a time when there was a threshold amount of interaction with the social networking system 140 or when a threshold number of users interacted with the social networking system 140 may be increased relative to scores of content items posted at different times. As an example, scores of content items posted to the social networking system 140 during an event when an increased amount of content items are posted to the social networking system 140 are increased relative to content items posted to the social networking system 140 before or after the event.

Based at least in part on the generated scores, the social networking system 140 selects 325 one or more of the content items. For example, content items having at least a threshold score are selected 325. In another example, the content items are ranked based at least in part on their associated scores, and content items having at least a threshold position in the ranking or having highest positions in the ranking are selected 325 by the social networking system 140.

The social networking system 140 generates 330 an additional feed of content items that includes the selected one or more content items. The selected one or more content items may be ranked based on their associated scores and associated with locations in the additional feed based on their positions in the ranking. In one embodiment, the additional feed is provided to a user in addition to the generated feed. Alternatively, the additional feed may be included in the generated feed. For example, the additional feed is combined with the generated feed with an indication presented with a content item of whether the content item is from the additional feed or from the generated feed. Alternatively, the additional feed may be appended to the beginning or end of a portion of the generated feed visible to the user, or combined based on the generated scores of the one or more content items in the additional feed. The additional feed can be stored in the content store 210 by the social networking system 140 and communicated 335 to a client device 110 when the social networking system 140 receives an indication that the user has viewed a threshold number of content items from the feed. Alternatively, the additional feed is communicated 335 to a client device 110 associated with the user, which stores the additional feed; when the client device 110 receives an input from the user requesting the additional feed or interacting with at least a threshold number of content items from the feed, the additional feed is retrieved and presented by the client device 110.

Presentation of a content item in the additional feed may be based at least in part on a score associated with the content item. For example, the additional feed presents content items according to a template including various slots. In one embodiment, a content item is presented in each slot. Slots may have different sizes, and the size of a slot used to present a content item may be based at least in part on the score associated with the content item. For example, a size or a position in the feed of a slot used to present a content item is proportional to a score associated with the content item. In one embodiment, a content item associated with a relatively higher score than other content items in the feed is presented using a larger slot size or in a slot having a higher position in a display area than slots used to present the other content item.

In one embodiment, size of a slot in which a content item is presented may be modified based on a score for the content item. For example, if a content item's score exceeds a threshold score, one or more dimensions (e.g., width, height, area, aspect ratio, etc.) of a slot presenting the content item are increased. Similarly, if a content item's score does not exceed a threshold score, one or more dimensions of a slot presenting the content item may be decreased in some embodiments. Alternatively, a size of a slot presenting a content item is based on a comparison of the content item's score to a threshold score. For example, the size of the slot is based on a ratio of the content item's score to the threshold score, so a content item with a score that is 60% of the threshold score is presented in a slot having a size that is 60% of the default size of the slot. In one embodiment, if the content item's score equals or exceeds the threshold score, a size of the slot in which the content item is presented is not changed or is increased. In another example, if a content item's score is at least a minimum threshold score, a size of the slot presenting the content item does not change, while the size of the slot decreases if the score is less than the minimum threshold score.

Size of a slot presenting a content item may also be varied for groups of content items. For example, a set of content items with scores higher than scores associated with an additional set of content items may be presented in a portion of the additional feed including slots with areas greater than areas of slots in an additional portion of the additional feed in which the additional set of content items is presented. As previously described, size of the slots used to present different groups of content items may be determined based on scores associated with content items.

Figure 4:
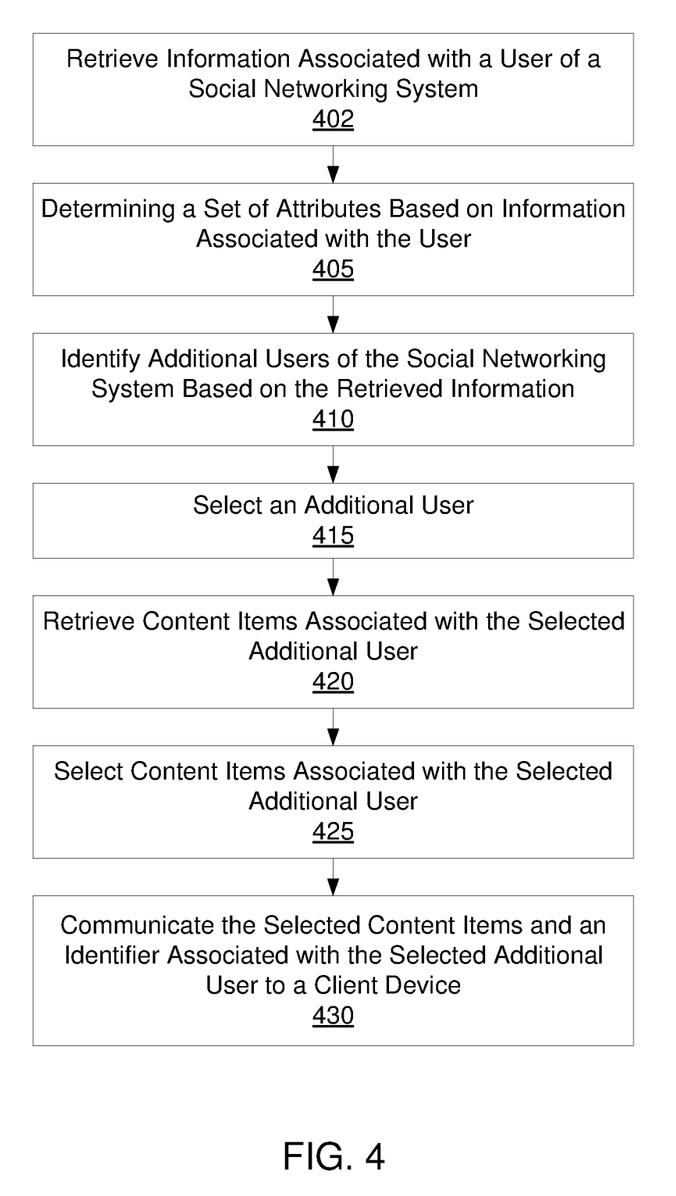
FIG. 4 is a flow chart of a method for identifying additional users to a user based on user attributes, in accordance with an embodiment.

Identifying Additional Users for a User Based on Attributes of the Additional Users FIG. 4 is a flow chart of one embodiment of a method for identifying additional users for a user based on attributes of the user and of the additional users. In various embodiments, the steps described in conjunction with FIG. 4 may be performed in different orders. Additionally, in some embodiments, the method may include different and/or additional steps than those shown in FIG. 4. The functionality described in conjunction with FIG. 4 may be provided by the newsfeed manager 230 and recommendation module 235 of the social networking system 140, in one embodiment, or may be provided by any other suitable component, or components, of the social networking system 140 in other embodiments. Additionally, the client device 110 may execute one or more instructions associated with the social networking system 140, such as an application associated with the social networking system 140, to provide the functionality described in conjunction with FIG. 4.

The social networking system 140 retrieves 402 information maintained by the social networking system 140 associated with a user of the social networking system 140. Retrieval 402 of information associated with the user is further described above in conjunction with FIG. 3. Based on the retrieved information, the social networking system 140 determines 405 one or more attributes associated with the user. Example attributes associated with the user include user-specific attributes, interaction-specific attributes, and time-based attributes. Attributes associated with the user are further described above in conjunction with FIG. 3.

One or more additional users of the social networking system are identified 410 based at least in part on the attributes associated with the user determined 405 from the retrieved information associated with the user. In one embodiment, the additional users are identified 410 as users having at least a threshold number of attributes matching or similar to attributes associated with the user. For example, a user is associated with attributes of female, age 24, hiking, drawing, running, and computer science; an additional user is associated with attributes of male, age 24, hiking, drawing, and engineering, while another additional user is associated with attributes of female, running, and dodge ball. The additional user shares three attributes with the user and the other additional user shares two attributes with the user. If the threshold number of attributes is two attributes, then both the additional user and the other additional user are identified 410. If the threshold number of attributes is three attributes, then the additional user, but not the other additional user, is identified 410.

Alternatively, additional users associated with content items having at least a threshold number or percentage of characteristics matching or similar to attributes associated with the user are identified 410. Referring to the previous example, the additional user may be associated with content items having the characteristics dodge ball, dogs, and running and the other additional user may be associated with content items having the characteristics architecture, landscape, and dogs. Then, the additional user has one out of three characteristics matching attributes of the user, while the other additional user has zero out of three characteristics matching the attributes of the user. If the threshold number of characteristics is one, the additional user is identified 410 and the other additional user is not identified. However, if the threshold number of characteristics is three, neither the additional user nor the other additional user is identified 410. If the threshold percentage of characteristics is more than 30%, then the additional user, which is associated with one out of three characteristics that match attributes of the user, is identified 410. If the percentage of characteristics is more than 50%, neither the additional user nor the other additional user is identified. In some embodiments, additional users are identified 410 by comparing both attributes of the additional users and characteristics of content items associated with the additional users to the attributes of the user. Continuing the preceding examples, the additional user has a total of four (out of 8) attributes and characteristics shared with the user and the other additional user has a total of two (out of 6) attributes and characteristics shared with the user. Again, if the threshold number of attributes and characteristics is three, the additional user would be identified 410 and the second additional user would not be identified 410. If the threshold percentage of attributes and characteristics is more than 30%, both the first and second additional users would be identified 410. If the threshold percentage of attributes and characteristics is more than 50%, the first additional user would be identified 410.

Alternatively, additional users are identified 410 based on interactions with content items by additional users and by the user. In one embodiment, an additional user having at least a threshold number of attributes matching or similar to attributes of the user is identified 410 if the additional user has interacted with at least a threshold number of content items having a characteristic (e.g., a topic) but the user has not interacted with at least the threshold number of content items having the characteristic. For example, after determining an additional user having at least a threshold number of attributes matching attributes of the user, the social networking system 110 determines if the additional user has interacted with at least a threshold number of content items associated with a topic; if the user has interacted with less than the threshold number of content item associated with the topic, the additional user is identified 140. This allows the social networking system 140 to identify additional users that are similar to the user and that have interacted with different content items than the user. Hence, the social networking system 140 may present the user with a broader variety of content items, increasing the interaction between the user and the social networking system 140. For example, attributes of users connected to an additional user that is connected to the user may be compared to attributes of the user to identify 410 additional users. For example, if the user is connected to an additional user and another additional user, attributes of users connected to the additional user and users connected to the other additional user may also be compared to the attributes of the user. Hence, attributes of users that are not connected to the user but are connected to another user that is connected to the user may be compared to attributes of the user as described above.

From the identified additional users, an additional user is selected 415 based at least in part on characteristics of content items associated with the additional user. For example, an additional user associated with at least a threshold number of content items having at least a threshold number of characteristics matching, or similar to, characteristics of content items with which the user has performed a specific type of interaction (e.g., expressed a preference for a content item, shared a content item with another user, etc.) is selected 415 from the identified additional users. As another example, an additional user associated with less than a threshold number of content items having at least a threshold number of characteristics matching, or similar to, content items with which the user performed a negative interaction (e.g., hiding a content item from presentation in a feed, etc.) is selected 415.

The social networking system retrieves 420 content items associated with the selected additional user. For example, content items that the selected additional user has provided to the social networking system 140 are retrieved 420. In other embodiments, content items with which the user has performed one or more types of interactions are retrieved 420. Alternatively, content items associated with the selected additional user are retrieved 420 based on characteristics of the content items. For example, content items associated with the additional user and having at least a threshold number of characteristics matching characteristics of content items associated with the user and/or matching attributes of the user are retrieved 420.

One or more of the retrieved content items are selected 425 based at least in part on attributes associated with the user. For example, content items having at least a threshold number of characteristics matching, or similar to, attributes of the user or having at least a threshold number of characteristics matching, or similar to, characteristics of content items associated with the user are selected 425. This allows selection of content items associated with the selected additional user that are most likely to be relevant to the user. As described above, characteristics of retrieved content items may be compared to different types of attributes associated with the user (e.g., user-specific attributes, interaction-specific attributes, time-based attributes) to determine the user's likely interest in various content items.

The selected one or more content items are communicated 430 from the social networking system 140 to a client device 110 for presentation to the user along with an identifier associated with the selected additional user. In one embodiment, the selected one or more content items are communicated 430 to the client device for presentation in an additional feed, as described above in conjunction with FIG. 3, with an identifier associated with the selected additional user presented proximate to the content items associated with the selected additional user. Examples of an identifier associated with the selected additional user include a username, a profile picture, or other information suitable for identifying the selected additional user from other social networking system users. Alternatively, multiple additional users may be selected and a user identifier associated with each of the selected additional user communicated to the client device 110 for presentation. In one embodiment, the user identifiers can be presented in the additional feed with the selected one or more content items. In some embodiments, an interface element is presented along with the user identifier associated with a selected additional user, allowing the user to establish a connection to the selected additional user through the social networking system 140 by interacting with the interface element.

SUMMARY

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
in response to a user using a social networking system, retrieving stored information associated with the user, wherein the stored information comprises a plurality of content items such that each content item comprises a characteristic;
grouping the plurality of content items based on an attribute type comprising at least: i) user-specific, ii) interaction-specific and iii) time-based, wherein the characteristic of each content item is associated with the attribute type;
determining a distinct weight value for each attribute type;
determining a score for the content items based on the distinct weight value associated with each attribute type;
identifying two or more other users of the social networking system, wherein the score determined for the content items associated with the two or more other users exceeds a threshold;
generating a selectable feed, the selectable feed comprising a set of video content items that include one or more video content items that the two or more other users have posted on the social networking system;
in response to the user selecting the selectable feed, causing display of a video content item in the set of video content items along with information associated with an other user of the two or more other users that posted the video content item, the information including a selectable identifier the selection of the selectable identifier causes display of additional information and content items associated with the other user.

2. The method of claim 1, further comprising:
receiving input from the user selecting the selectable identifier;
retrieving one or more video content items associated with the other user; and
causing display of the retrieved one or more video content items to the user.

3. The method of claim 1, further comprising:
receiving input from the user selecting the selectable identifier;
retrieving one or more video content items associated with the other user, the one or more video content items having at least a threshold number of attributes that match the attributes of the user; and
causing display of the retrieved one or more video content items to the user.

4. The method of claim 1, wherein the selectable identifier includes any of: a username, a profile picture, or other information suitable for identifying an associated user from other users of the social networking system.

5. The method of claim 1, wherein the retrieved stored information associated with the user includes one or more of: demographic information associated with the user, connections between the user and other users of the social networking system, interactions between the user and one or more video content items, or demographic information associated with users connected to the user by the social networking system.

6. The method of claim 1, wherein the retrieved stored information associated with the user includes one or more of: a location of the user associated with one or more interactions between the user and one or more video content items or a type of device associated with an interaction between the user and a video content item.

7. The method of claim 1, further comprising:
receiving input from the user selecting the selectable identifier;
retrieving one or more video content items associated with the other user;
retrieving a template for presenting the one or more video content items the template including a plurality of slots, each slot specifying a location for presentation of a video content item;

assigning a slot of the plurality of slots to a video content item of the one or more video content items based at least in part on a score associated with the video content item; and causing display of video content items assigned to one or more of the plurality of slots to the user.

8. The method of claim 1, further comprising:

receiving input from the user selecting the selectable identifier;

retrieving one or more video content items associated with the other user;

retrieving a template for presenting the one or more video content items the template including a plurality of slots, each slot specifying a location for presentation of a video content item;

assigning a slot of the plurality of slots to a video content item of the one or more video content items based at least in part on a score associated with the video content item;

modifying a dimension of the assigned slot based at least in part on the score associated with the video content item; and causing display of video content items assigned to one or more of the plurality of slots to the user.

9. One or more non-transitory computer-readable media, storing one or more sequences of instructions, wherein execution of the one or more sequences of instructions by one or more processors causes the one or more processors to perform:

in response to a user using a social networking system, retrieving stored information associated with the user, wherein the stored information comprises a plurality of content items such that each content item comprises a characteristic;

grouping the plurality of content items based on an attribute type comprising at least: i) user-specific, ii) interaction-specific and iii) time-based, wherein the characteristic of each content item is associated with the attribute type;

determining a distinct weight value for each attribute type;

determining a score for the content items based on the distinct weight value associated with each attribute type;

identifying two or more other users of the social networking system, wherein the score determined for the content items associated with the two or more other users exceeds a threshold;

generating a selectable feed, the selectable feed comprising a set of video content items that include one or more video content items that the two or more other users have posted on the social networking system; and in response to the user selecting the selectable feed, causing display of a video content item in the set of video content items along with information associated with an other user of the two or more other users that posted the video content item, the information including a selectable identifier, the selection of the selectable identifier causes display of additional information and content items associated with the other user.

10. The one or more non-transitory computer-readable media of claim 9, further comprising:

receiving input from the user selecting the selectable identifier;

retrieving one or more video content items associated with the other user; and causing display of the retrieved one or more video content items to the user.

11. The one or more non-transitory computer-readable media of claim 9, further comprising:

receiving input from the user selecting the selectable identifier;

retrieving one or more video content items associated with the other a particular user, the one or more video content items having at least a threshold number of attributes that match the attributes of the user; and causing display of the retrieved one or more video content items to the user.

12. The one or more non-transitory computer-readable media of claim 9, wherein the selectable identifier includes any of: a username, a profile picture, or other information suitable for identifying an associated user from other users of the social networking system.

13. The one or more non-transitory computer-readable media of claim 9, wherein the retrieved stored information associated with the user includes one or more of:

demographic information associated with the user, connections between the user and other users of the social networking system, interactions between the user and one or more video content items, or demographic information associated with users connected to the user by the social networking system.

14. The one or more non-transitory computer-readable media of claim 9, wherein the retrieved stored information associated with the user includes one or more of: a location of the user associated with one or more interactions between the user and one or more video content items or a type of device associated with an interaction between the user and a video content item.

15. The one or more non-transitory computer-readable media of claim 9, further comprising:

receiving input from the user selecting the particular selectable identifier;

retrieving one or more video content items associated with the other user;

retrieving a template for presenting the one or more video content items the template including a plurality of slots, each slot specifying a location for presentation of a video content item;

assigning a slot of the plurality of slots to a video content item of the one or more video content items based at least in part on a score associated with the video content item; and causing display of video content items assigned to one or more of the plurality of slots to the user.

16. The one or more non-transitory computer-readable media of claim 9, further comprising:

receiving input from the user selecting the selectable identifier;

retrieving one or more video content items associated with the other user;

retrieving a template for presenting the one or more video content items the template including a plurality of slots, each slot specifying a location for presentation of a video content item;

assigning a slot of the plurality of slots to a video content item of the one or more video content items based at least in part on a score associated with the video content item;

modifying a dimension of the assigned slot based at least in part on the score associated with the video content item; and causing display of video content items assigned to one or more of the plurality of slots to the user.

17. A system, comprising:
one or more processors; and
a memory storing instructions, which when executed by the one or more processors, cause the one or more processors to:
   in response to a user using a social networking system, retrieve stored information associated with the user;
   identify two or more other users of the social networking system that have at least a threshold number of attributes that match or are similar to attributes of the user determined from the retrieved information, wherein the stored information comprises a plurality of content items such that each content item comprises a characteristic;
   group the plurality of content items based on an attribute type comprising: i) user-specific, ii) interaction-specific or iii) time-based, wherein the characteristic of each content item is associated with the attribute type;
   determine a distinct weight value for each attribute type;
   determine a score for the content items based on the distinct weight value associated with each attribute type;
   generate a selectable feed, the selectable feed comprising a set of video content items that include one or more video content items that the two or more other users have posted on the social networking system; and
   in response to the user selecting the selectable feed, cause display of a video content item in the set of video content items along with information associated with an other user of the two or more other users that posted the video content item, the information including a selectable identifier the selection of the selectable identifier causes display of additional information and content items associated with the other user.

18. The system of claim 17, wherein the instructions, which when executed by the one or more processors, further cause the one or more processors to:
   receive input from the user selecting the selectable identifier;
   retrieve one or more video content items associated with the other user;
   cause display of the retrieved one or more video content to the user.

19. The system of claim 17, wherein the instructions, which when executed by the one or more processors, further cause the one or more processors to:
   receive input from the user selecting the selectable identifier;
   retrieve one or more video content items associated with the other user, the one or more video content items having at least a threshold number of attributes that match the attributes of the user; and
   cause display of the retrieved one or more video content items to the user.

20. The system of claim 17, wherein the selectable identifier includes any of: a username, a profile picture, or other information suitable for identifying an associated user from other users of the social networking system.

\* \* \* \* \*